UNITED STATES PATENT OFFICE.

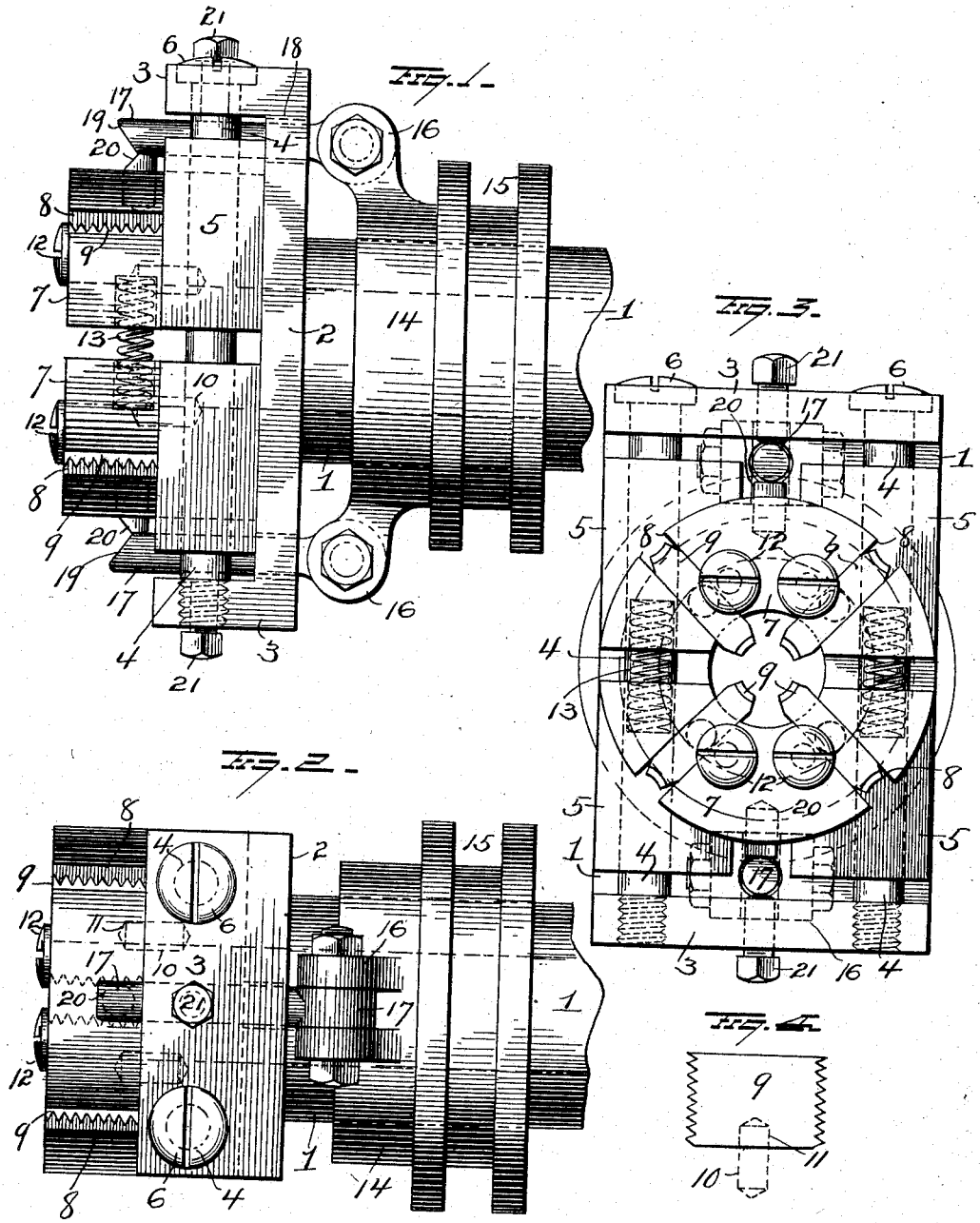

JAMES A. BECHER, OF CHICAGO, ILLINOIS.

DIE STOCK OR HEAD.

1,015,282.  Specification of Letters Patent.  Patented Jan. 23, 1912.

Application filed August 9, 1910. Serial No. 576,422.

*To all whom it may concern:*

Be it known that I, JAMES A. BECHER, of Chicago, in the county of Cook and State of Illinois, have invented certain new and useful Improvements in Die Stocks or Heads; and I do hereby declare the following to be a full, clear, and exact description of the invention, such as will enable others skilled in the art to which it appertains to make and use the same.

This invention relates to improvements in die stocks or heads, one object of the invention being to provide simple and efficient means for moving the die carrying jaws toward each other and to so construct such means that the same can be utilized in effecting the working adjustment of said jaws and the dies which they carry.

A further object is to provide a die stock or head which shall be simple in construction; in which double ended dies can be properly supported and utilized, and which shall be effectual in all respects in accomplishing the purposes for which it is intended and in withstanding strain to which devices of this character are subjected.

With these and other objects in view the invention consists in certain novel features of construction and combinations of parts as hereinafter set forth and pointed out in the claims.

In the accompanying drawings, Figure 1 is an elevation of a die stock or head embodying my improvements. Fig. 2 is a view at right angles to Fig. 1. Fig. 3 is a face view, and Fig. 4 is a detail view of one of the dies or cutters.

1 represents a shaft, to one end of which a rectangular head 2 is rigidly secured and provided at its ends with parallel arms or flanges 3. Guide-bars 4 pass through said arms or flanges so as to be disposed parallel with the head 2 and serve as guides for jaws 5, each of said bars 4 being provided at one end with a suitable head 6 and threaded at the other end for the reception of a nut or to screw through suitable threaded sockets or holes in the lower arm or flange 3 of the head 2. Each jaw 5 may have a rectangular body portion disposed against the head 2 and movable on the guide-bars, and an outwardly projecting enlargement 7 which is preferably semicircular in form. That enlargement 7 of each jaw is provided with slots 8 for the reception of dies or cutters 9. Each die or cutter is made double ended,— viz., with cutting teeth at each end,—so that it can be reversed and each end be capable of doing work in cutting threads. In order that the dies may be accurately located and held in place in the slots in the jaws, dowel pins 10 are provided in the bottoms of said slots to enter sockets 11 in the dies. The dies are prevented from escape by means of the heads of screws 12 secured to the jaws as clearly illustrated in Fig. 3. Springs 13 operate to move the jaws away from each other and said jaws are caused to approach each other for the purpose of bringing the dies to working position, by means of the devices which will now be explained.

A sheave or collar 14 is mounted to slide on and to rotate with the shaft 1 and this sheave or collar is provided with a groove 15 for the reception of a suitable shifting lever. The sheave or collar 14 is provided, preferably at diametrically opposite points, with lugs or ears 16 and to these lugs or ears, pins or rods 17 are pivotally attached. The pins or rods 17 pass freely through holes 18 in the fixed head 2 and extend past the arms or flanges 3 of said fixed head. The forward ends of the rods or pins 17 are beveled as shown at 19 to coöperate with lugs 20 on the semi-circular portions of the jaws 5 for the purpose of causing said jaws to move toward each other and bring the dies to working position. Screws 21 are passed through the arms or flanges 3 and engage the pivoted pins or rods 17 and prevent outward or radial movement of said rods or pins. By adjusting these screws, the rods or pins will be caused to move somewhat on their pivotal connections with the lugs or ears 16 and consequently the extent of movement of the jaws and dies toward the work can be adjusted. Thus it will be seen that the rods or pins 17 can be utilized, both in the operation of the jaws to move the dies to their work and also in the adjustment of dies relatively to the work.

Having fully described my invention what I claim as new and desire to secure by Letters-Patent, is,—

1. The combination with a shaft, a head fixed thereto and provided with parallel arms or flanges, of guide-bars connecting said arms or flanges, die holding jaws movable on said guide-bars, a sheave or collar, and pins attached to said sheave or collar, passing through said fixed head and cooperating with the jaws to move them toward each other.

2. The combination with a shaft, a head fixed thereto and die holding jaws movably supported in said head and provided with lugs, of a sheave or collar slidable on and rotatable with said shaft, rods or pins pivotally connected with said sheave or collar and passing freely through the fixed head, said rods or pins being beveled at their free ends and adapted to coöperate with the lugs on the jaws to move the latter toward each other, and screws to engage said rods or pins for adjusting the same to adjust the extent of movement of the jaws toward each other and the dies carried by said jaws relatively to the work.

In testimony whereof, I have signed this specification in the presence of two subscribing witnesses.

JAMES A. BECHER.

Witnesses:
H. B. KEMP,
M. E. LOCKE.

Copies of this patent may be obtained for five cents each, by addressing the "Commissioner of Patents, Washington, D. C."